Dec. 3, 1946.  C. RINGWALD  2,411,980
ELECTRODE HOLDER
Filed Sept. 25, 1943  2 Sheets-Sheet 1
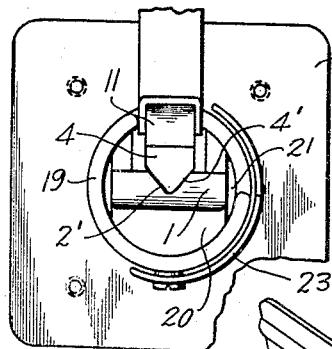
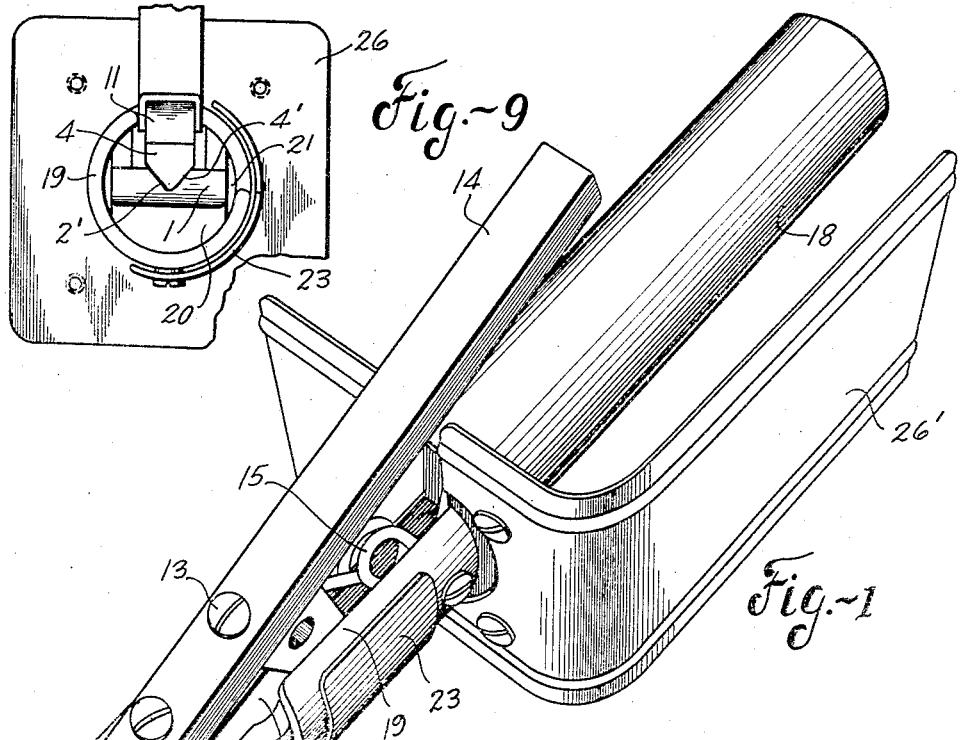
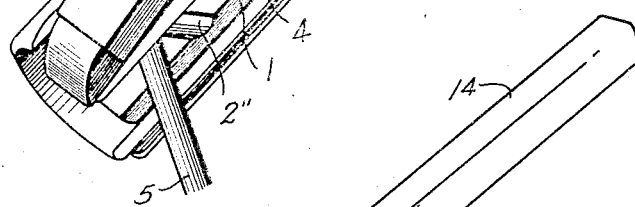
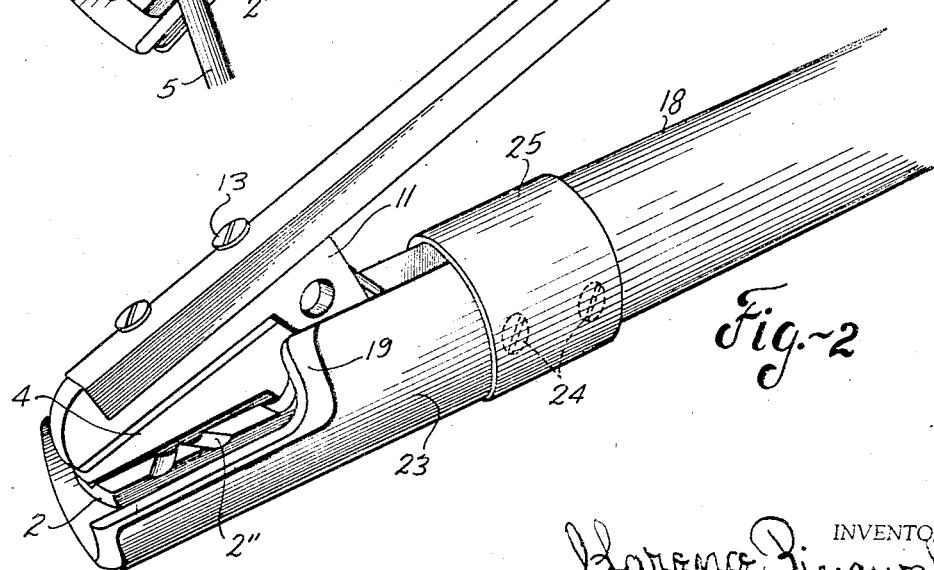

Dec. 3, 1946. C. RINGWALD 2,411,980
ELECTRODE HOLDER
Filed Sept. 25, 1943 2 Sheets-Sheet 2
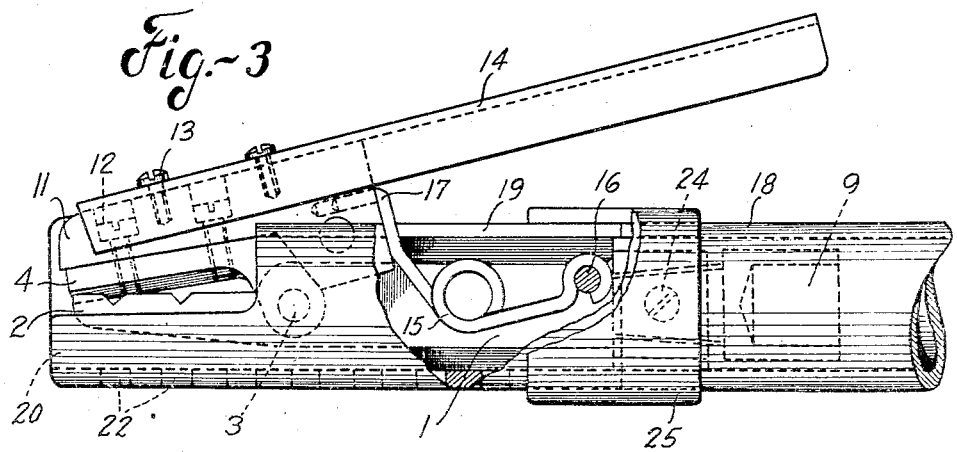
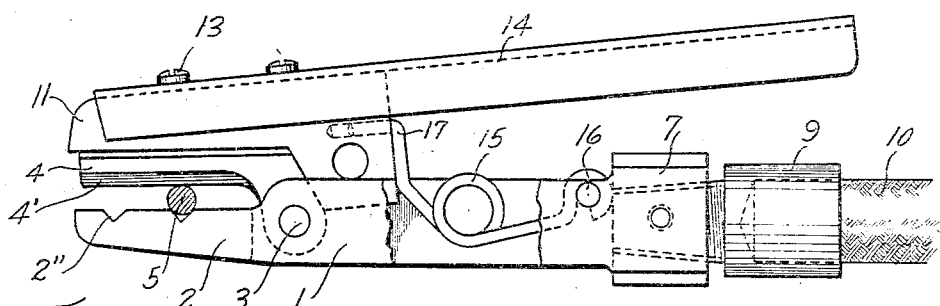
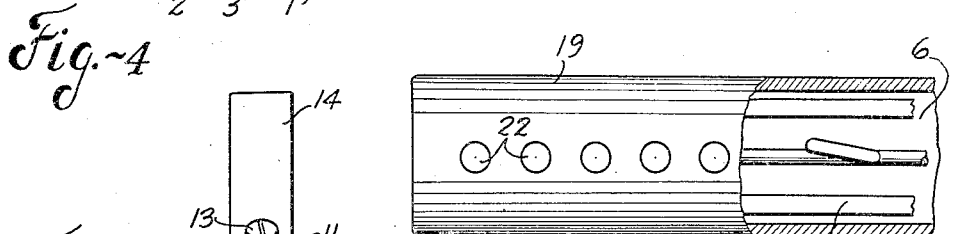
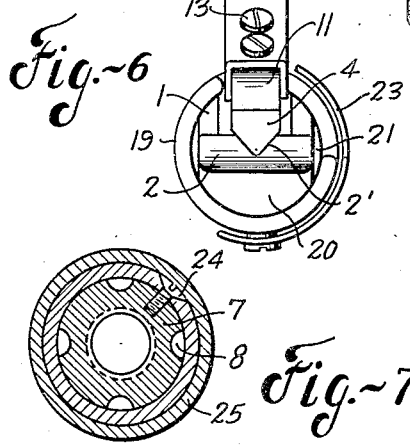
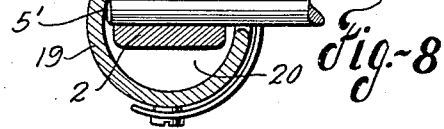
INVENTOR.
Clarence Ringwald
BY F. L. Walker
ATTORNEY.

Patented Dec. 3, 1946

2,411,980

UNITED STATES PATENT OFFICE 2,411,980

ELECTRODE HOLDER

Clarence Ringwald, Springfield, Ohio

Application September 25, 1943, Serial No. 503,735

20 Claims. (Cl. 219—8)

This invention pertains to electric welding equipment, and more particularly to an electrode holder or welding rod clamp for adjustably holding a welding rod and conveying electric current thereto while it is being used.

While for illustrative purpose, but with no intent to unduly limit or restrict the scope or application of the invention, it is herein shown and described as embodied in an electrode holder or welding rod gripper of the inter-pivoted clamp jaw type, it is to be understood that it is not limited thereto, but features of the present disclosure are readily applicable to holders of other construction or style.

In performing welding operations, the operator's eyes being protected by goggles, or his head being enclosed in a protective hood, his range of vision is restricted, and in moving the welding rod holder about, the rear end or normally inactive terminal of the electrically charged rod may accidentally come into contact with the work at a point other than at the weld, or may contact some other body, in which event the rod may become welded fast at such point, or damage result.

The rod holder elements being directly connected in the electrical energizing circuit, and being quite close to the welding operation, develop quite high temperatures. It is therefore desirable that the various electrically charged parts be electrically and thermally insulated.

In the present instance there is contemplated an insulating encasement for the charged metallic parts of the holder, which not only protect against contact therewith and electric shock and burns, but which also provides air spaces and passages and ventilating ports through which atmospheric air may readily circulate for cooling the metallic parts and dissipation of generated heat. The insulating encasement not only protects the welding rod holder parts, but also protects and forms a stop for the rear end of the rod, which prevents accidental contact thereof with the work or another grounded body. The insulating encasement also prevents short circuiting or current leakage, and accidental welding of the holder to a support when laid down during idle intervals.

The object of the invention is to improve the construction as well as the means and mode of operation of welding electrode or rod holders, whereby they may not only be economically manufactured, but will be more efficient in use, safe in operation, compact in form, of relatively light weight, easily operable to release the rod, having relatively few parts, and be unlikely to get out of repair.

A further object of the invention is to provide an insulating encasement for the operating parts of the holder, which does not materially increase the size or weight of the device, and which affords maximum protection aaginst electric shock and burns, and which is easily and readily removable and replaceable for inspection and repair of parts, and renewal of the insulating casing.

A further object of the invention is to provide an insulating encasement, at the surface of which no metallic parts or attachment screws will be exposed through which accidental current leakage might occur or shock be suffered.

A further object of the invention is to provide a ventilating system of air spaces and passages and ventilating ports for circulation of air about the metallic parts for cooling purposes and the dissipation of heat.

A further but none the less important feature is the provision of an insulated stop and protector for the rear or normally inactive end of the welding rod to prevent accidental direct contact thereof with the work or operator, or with some other conductive body.

A primary object of the invention is to provide maximum insulative protection against electrical shock and grounding, and against heat and also maximum air cooling of the heated parts.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the accompanying drawings, wherein is illustrated the preferred but obviously not necessarily the only form of embodiment of the invention, Fig. 1 is a perspective view of an assembled welding rod holder embodying the present invention equipped with a detachable hand guard or shield.

Fig. 2 is a further perspective view thereof in somewhat different position with the hand shield removed.

Fig. 3 is a side elevation, partly broken away, of the assembled rod holder.

Fig. 4 is a side elevation, partly broken away, of the rod holder assembly with the insulating encasement removed.

Fig. 5 is a bottom plan view with a portion of the insulating encasement broken away.

Fig. 6 is an end elevation of the assembled holder.

Fig. 7 is an end elevation of the terminal of the main body.

Fig. 8 is a transverse sectional view showing the relation of the insulating material and the welding rod, the end of which is protected thereby.

Fig. 9 is a detail view of a detachable hand guard.

Like parts are indicated by similar characters throughout the several views.

Referring to the drawings, 1 indicates the metallic frame member or main body, terminating in the stationary clamp jaw 2, to which is pivoted at 3 a movable clamp jaw 4. The movable jaw 4 is offset somewhat relative to its pivotal point 3. The working face of the stationary jaw 2 is longitudinally and transversely grooved, as at 2' and 2'', to provide selective seats for the welding rod 5. The working face of the mating jaw 4 is beveled at 4' to agree with the longitudinal seat groove 2' of the lower jaw 2. The medial portion of the main body 1 is longitudinally slotted at 6 to reduce the bulk of material, and with it the weight of the holder, and to provide an air chamber through which atmospheric air may circulate for dissipation of radiated heat. The terminal 7 of the main member is somewhat enlarged and is provided in its periphery with longitudinal spaced grooves 8, affording air passages interiorly of the insulating encasement hereafter described which lead to the air space 6. The enlarged terminal 7 is bored and threaded with a tapered thread to receive a correspondingly threaded coupling 9 of an electrical conductor cable 10.

Overlapping the top and rear end of the oscillatory clamp jaw 4 is a block 11 of insulating material which is securely attached to the jaw by countersunk screws 12. Additional screws 13 secure a channel shaped handle lever 14 to the insulating block 11 and hence to the movable jaw 4. A helical tension spring 15 is positioned within the slot or air space 6 of the main member 1, with one end thereof hooked about a cross pin 16 extending therethrough, and its other end 17 seated in a socket or bore in the rear end of the insulating block 11. The spring is thus excluded from the electrical circuit and does not receive current and heating of the spring is minimized. The spring 15 is of sufficient tension to forcibly close the jaws 2—4 upon an interposed welding rod 5 to securely hold the latter in its adjusted position. The length of the handle lever 14 and its relation to the pivotal center 3 is such that minimum effort is required to open the jaws against the yielding resistance of the spring to release the welding rod.

To protect the operator against shock and burns, and prevent accidental contact of charged parts with the work or other conductor bodies to which the metallic parts might unintentionally become welded, the main frame member 1 and jaw are enclosed in an insulating encasement, which preferably, but not necessarily, comprises separable sections. As illustrated, a cylindrical tubular section 18 surrounds the rear portion of the frame member 1 together with the terminal 7 and coupling 9 and a contiguous portion of the electrical cable 10. This sleeve 18 of insulation material is straight and of a convenient size to serve as a handle for the rod holder. Enclosing the forward portion of the main frame 1 and the stationary jaw 2 is a cutaway continuation 19 of the sleeve 18, which may be integral therewith, but is preferably a separable section. The forward or terminal portion of the insulating section 19 is cut away at one side from the top to approximately the horizontal diameter of such continuation or forward insulating section 19 to expose the jaws 2 and 4 at one side, as shown in Figs. 1, 2, 3 and 5. This enables the welding rod 5 to be inserted and adjusted from such side only. At the opposite side the arcuate wall of the insulating section 19 continues upwardly almost to the vertical diameter of the circular insulating section. Thus, the latter side of the insulating section encloses the opposite side of the jaws 2 and 4 and overhangs and protects the end of the welding rod 5, for which this arcuate wall of the insulating section 19 forms a stop. This prevents the rear end 5' of the welding rod from accidently contacting the work or other body, or being contacted by the hand of the operator. At the top of the insulating section 19 and rearwardly of the cutaway portion there is a longitudinal slot in the top thereof through which the jaw insulating block 11 projects. The differential shapes of the metallic main frame 1 and the interior of the cylindrical insulating sections 18 and 19 affords an intermediate air space 20 beneath the jaw 2 and main frame 1 which communicates with the air space 6 in the body of the member 1, and also provides lateral air spaces 21 which communicate with the bottom space 20 and with the air space 6. These air spaces 20 and 21 and the space 6 of the main body also communicate with the interior of the handle section 18 about the cable 10, through the passages 8 in the periphery of the terminal 7.

The bottom of the insulating section 19 is provided with a series of air ports 22 through which atmospheric air may enter the spaces 20, 21 and 6 for circulation about the heated metal parts for cooling the latter and dissipating the heat. To protect the section 19 from being burned by heat radiated from the point of welding operation, a shield 23 is preferably attached to the section 19 in parallel exterior spaced relation therewith beneath and to the rear of the cutaway portion. The relative spacing of this shield enables circulation of air in the space intermediate the shield and the insulating section. Such auxiliary shield protects the insulating material from being burned by the intense heat generated during the welding operation, and especially when a shortened rod is being used close to the holder. The guard prevents charring and disintegration of the insulating material. Being supported on the insulation independently of the main body 1 and clamp jaws, the shield 23 is not electrically charged and will not shock or weld fast upon contact.

The insulating sections 18 and 19 being of cylindrical form readily retain their positions about the metallic parts, but to prevent displacement are secured by screws 24 inserted therethrough into the main body 1. The walls of the insulating casing are relatively thin. However such screws are countersunk therein. To prevent accidental contact with the heads of such screws, and shock to the operator or grounding of the implement, a contractively tensioned split sleeve 25 of insulating material is slidably mounted upon the insulating sections 18 and 19 and may be shifted to and fro into and out of overlying relation with the screw heads where it is retained by friction.

The section encasement 18 and 19 may be used as shown in Fig. 2 without a hand guard or shield, but readily accommodates itself to the addition of such guard, which may be interposed between the adjacent ends of the insulating sections 18 and 19 by retracting the former. Such guard may comprise a simple disc or collar 26 of insulating material or of metal with a bushing of insulating material which may be adjusted to position surrounding the main body 1 and abutting the end of the insulating section 19, after which the insulating section 18 is advanced into thrust engagement therewith to clamp the guard between the adjacent ends of the insulating sections. In lieu of such collar the guard may be slotted to enable it to be inserted transversely of the member 1 into position intermediate the ends of the sections 18 and 19. In Fig. 1 the guard 26' is shown as of L shape, comprising a sheet metal extension attached to the primary collar or bushing of insulating material 26. This guard is removable or replaceable at will, and serves to protect the operator's hands and clothing from sparks and metal particles which may fly from the point of welding operation.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. An electrode holder, including an elongated member, an integral clamp jaw at one end of said member, a connection for an electric power cable at the other end of the member, the member being longitudinally slotted intermediate the clamp jaw and the cable connection, a complementary clamp jaw pivoted thereto in cooperating relation with the clamp jaw portion of said member, an insulating block attached to and movable with the pivoted clamp jaw, an operating lever attached to the insulating block and insulated from the pivoted clamp jaw, a spring member located within the slot of the elongated member and attached thereto at one end and engaged with the insulating block at its opposite end, and a tubular sleeve of insulating material enclosing said elongated member and pivoted clamp jaw having a cutaway portion through which the insulating block extends and affording access to the clamp jaws.

2. An electrode holder, including a relatively straight elongated member, a stationary gripper jaw at one end thereof, a detachable electric cable connection at the opposite end, an opening in the member intermediate the jaw and cable connection, reducing the weight of the member and affording a ventilating space, a complementary spring influenced clamp jaw pivoted to said member, an insulating block secured to the pivoted clamp jaw, an operating lever secured to the insulating block for retracting the pivoted jaw against the influence of its spring influence, a tubular sleeve of insulating material enclosing the assembly of the elongated member the clamp jaws and cable connection, affording a handle therefor, open at its end and one side to afford access to the jaws for insertion of a welding rod and enclosing the jaws at the opposite side thereof to protect the rear end of the welding rod against contact with extraneous objects.

3. An electrode holder, including an elongated member, an integral clamp jaw at one end thereof, a coupling for an electric cable at the opposite end thereof, the member being slotted intermediate the clamp jaw and cable coupling, a complementary clamp jaw pivoted thereto, an actuating spring for the pivoted clamp jaw positioned within the slot of the main member, with one end engaging with said member, an insulator attached to the pivoted jaw with which the other end of the spring is engaged, and an actuating lever for the pivoted jaw attached to the insulator.

4. An electrode holder, including a pair of interpivoted clamp jaws, a support therefor, a coupling for connecting an electric cable with the support, a housing of insulating material enclosing the said assembly, having a cutaway portion affording access to one side only of the clamp jaws for reception of a welding rod, and a portion of the insulating material housing at the opposite side of the jaws affording a limiting stop for one end of the welding rod, protecting the latter against accidental contact with an extraneous object.

5. An electrode holder, including a pair of clamp jaws, a support therefor, a coupling head for an electric cable, a cylindrical tubular insulating housing enclosing the assembly having a cutaway portion affording access to one side of the clamp jaws, the other side of the clamp jaws being enclosed within the housing, and air passages intermediate said assembly and the wall of the tubular housing for circulation of atmospheric air to dissipate generated heat, the insulating housing having ventilating openings therein communicating with the air passages.

6. An electrode holder wherein an electric welding rod is detachably engageable with a pivoted jaw gripping device including an insulating member forming a stop for the rear end of a welding rod engaged by the pivoted jaw of the gripping device and preventing electrical contact of the rear end of the rod with extraneous objects the construction and arrangement being such that the welding rod is engageable with the pivoted jaw gripping device independently of the insulating material in universally adjustable relation to the gripping device.

7. A tube of insulating material to receive electric welding rod engaging devices and an electric cable connection therefor, open at an end and cut out at one side to enable insertion of a welding rod into the rod engaging devices, including a portion overlapping the rod engaging devices at the side opposite said cutout to protect the inserted end of a welding rod against electrical contact with extraneous objects.

8. An electrode holder wherein a welding rod is detachably engageable with a rod gripping device with which an electric cable is also engageable, including a housing of insulating material enclosing the rod gripping device and a cable connection, having an access opening through which a welding rod is engageable with the device and an insulating portion of said housing extending into overlapping relation with the rear end of a welding rod when engaged therewith, to limit the extent to which the rod may be inserted relative to the gripping device and protecting the rear end of the rod against electrical contact with extraneous objects.

9. An electrode holder wherein a welding rod is detachably engageable with a rod gripping device of the interpivoted jaw type to which an electric cable is also engageable, including a tubular cylindrical insulating housing therefor of substantially uniform diameter throughout, comprising an uninterrupted portion thereof surrounding and enclosing the point of engagement of the electrical cable with the rod gripping device and forming a handle grip therefor, and a terminal portion thereof common to the interpivoted jaws of the gripping device in partially surrounded relation therewith slotted only at one side to afford access to the gripping device and limit the rearward extension of the welding rod.

10. An electrode holder, including a pair of interpivoted clamp jaws of polygonal cross section, a cylindrical tubular housing of insulating material common to both the jaws and of substantially uniform diameter throughout enclosing the jaws in relatively spaced relation a portion of which is cut away to afford access to the jaws at one side only thereof, and intervening air passages within the housing and about the jaws intermediate the polygonal faces of the jaws and the cylindrical wall of the housing for dissipating generated heat.

11. An electrode holder, including an elongated member, a stationary clamp jaw at one end thereof, a cable coupling for an electric power cable at the opposite end, the member having therein an elongated transverse slot intermediate the stationary clamp jaw and the cable coupling forming a vertical air passage therethrough, a spring actuated clamp jaw pivoted to said member, an actuating spring located within said slot of the elongated member and exerting yielding pressure upon the movable jaw, an operating lever for the movable jaw, an insulating housing enclosing the assembly, and air passages within the housing communicating with said slot of the elongated member.

12. An electrode holder, including a main member, an integral clamp jaw at one end thereof, a detachable coupling for an electric cable at the other end of the member, a spring actuated complementary clamp jaw pivoted to said member, a housing of insulating material enclosing said member and clamp jaws, having a cutaway portion affording access to one side only of the clamp jaws, a portion of said housing at the opposite side of the jaws affording a limiting stop for the end of a welding rod engaged by the jaws.

13. An electrode holder, including an elongated main member, a stationary clamp jaw formed at one end thereof, a detachable coupling for an electric cable at the opposite end thereof, said member having an opening therein intermediate the stationary jaw and the cable coupling, a spring actuated complementary clamp jaw pivoted to the member, an insulating housing enclosing the said assembly and an air passage leading through the housing from atmosphere to the opening and thence through said opening.

14. An electrode holder wherein a welding rod is releasably engageable with a gripper unit to which an electric cable is detachably connected, including a cylindrical tubular housing of insulating material enclosing the unit and having a cutaway portion affording access to the unit for engagement of a welding rod therewith, and a limiting stop portion at the side of the unit opposite such cutaway portion overlapping and protecting one end of the engaged welding rod.

15. An electrode holder wherein a welding rod is releasably engageable with a gripper unit to which an electric cable is detachably connected, including a cylindrical tubular housing of insulating material enclosing the unit and having a cutaway portion affording access to one side of the unit for engagement of a welding rod therewith, and air passageways intermediate the unit and the housing for circulation of air for dissipating generated heat.

16. An electrode holder wherein a welding rod is releasably engageable with a gripper unit to which an electric cable is detachably connected, including a cylindrical tubular housing of insulating material enclosing the unit and having a cutaway portion affording access to the unit for engagement of a welding rod therewith, and a limiting stop at the side of the unit opposite such cutaway portion overlying and protecting one end of an engaged welding rod, said tubular housing comprising separable sections arranged end to end, and a guard member interposed between the sections.

17. An electrode holder, wherein a welding rod is detachably gripped between a pair of relatively adjustable jaws, to which an electric cable is connected, including an insulating housing enclosing the jaws at one side thereof to afford a stop for an end of the welding rod, to protect it from contact with extraneous objects, the housing being shaped to expose the opposite side and the ends of the jaws for insertion of the welding rod therebetween.

18. An electrode holder, wherein a welding rod is detachably engageable between a pair of relatively adjustable jaws to which an electric cable is connected, including a housing of insulating material enclosing the assembly of jaws and cable connection, comprising relatively adjustable sections, a portion of which forms a handle grip, and an L shaped guard member having an opening in one arm thereof, through which the jaw and cable connection may be extended with said arm of the guard positioned intermediate succeeding sections of the insulating housing and held in adjusted position thereby, and with the other arm of the guard extending in overlapping parallel spaced relation with the handle grip portion of the housing.

19. An electrode holder, wherein a welding rod is engageable with a rod gripping device with which an electric cable is also detachably engageable, including an insulating housing enclosing the rod gripping device having an opening for insertion of a welding rod into said gripping device, and a guard member attached in spaced relation to the exterior of the insulating housing adjacent the said opening, and an air space formed intermediate the guard and the insulating housing, protecting the material of the latter from the influence of heat at the point of welding operation.

20. An electrode holder, including an elongated member, an integral clamp jaw at one end thereof, a connection for an electric cable at the opposite end thereof, a longitudinal slot therein intermediate the jaw and cable connection, a complementary clamp jaw pivoted to said member, an operating lever therefor insulated from the pivoted jaw, a housing of insulating material enclosing said assembly, having an access opening for insertion of a welding rod between said jaws, air passages within said housing connecting the longitudinal slot in said elongated member with atmosphere for circulation of air therethrough to dissipate heat, a hand guard associated with said housing and extending laterally thereof, and a guard relatively spaced from said housing forming an air passage therebetween to protect a portion of the housing against the effect of heat at the point of welding operation.

CLARENCE RINGWALD.